United States Patent Office 3,465,912
Patented Sept. 9, 1969

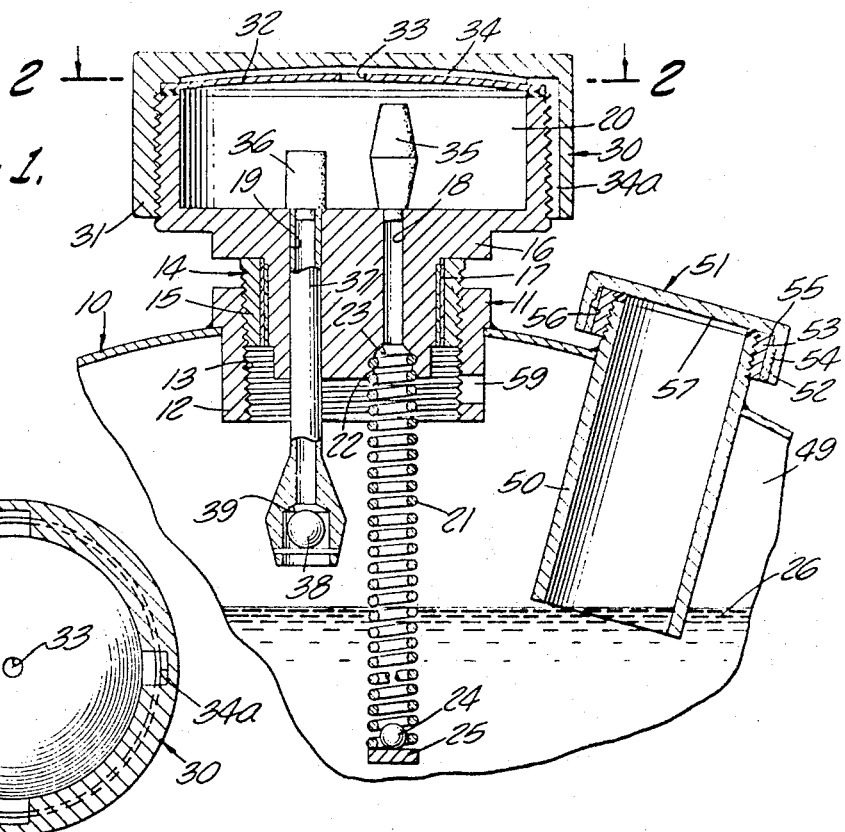
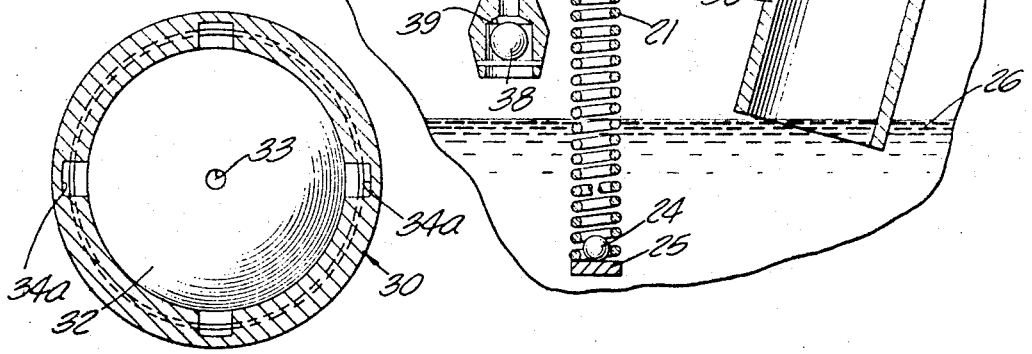
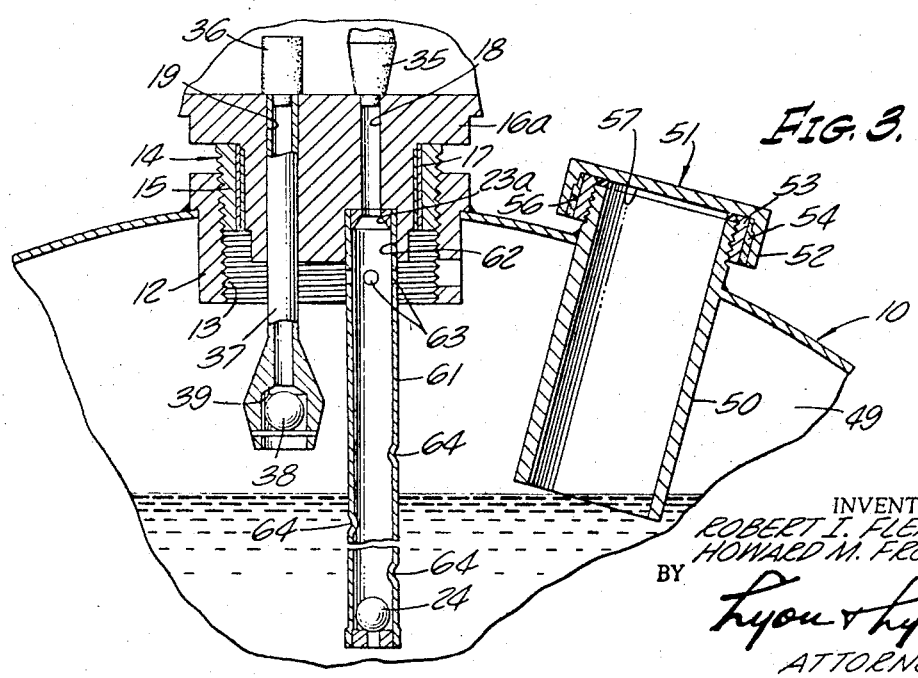

3,465,912
SAFETY VENT AND FILLER CAP FOR VEHICLE GASOLINE TANK
Robert I. Fleming, Newport Beach, and Howard M. Froby, Lynwood, Calif., assignors to Fleming Metal Fabricators, Los Angeles, Calif., a corporation of California
Application Dec. 2, 1966, Ser. No. 598,652, now Patent No. 3,385,468, dated May 28, 1968, which is a continuation-in-part of application Ser. No. 472,268, July 15, 1965. Divided and this application Dec. 1, 1967, Ser. No. 714,374
Int. Cl. B65d 25/20, 51/16
U.S. Cl. 220—89         5 Claims

ABSTRACT OF THE DISCLOSURE

A thin annular band of fusible alloy joins a body member to a threaded ring element, and the latter is threadedly engaged with a tubular member communicating with the interior of a fuel tank. When the temperature of the fusible alloy reaches its melting point, the body member may separate axially from the ring element to permit venting of the tank to atmosphere.

---

This application is a division of our copending application Ser. No. 598,652 filed Dec. 2, 1966, now Patent No. 3,385,468 granted May 28, 1968. That application was a continuation-in-part of our copending application Ser. No. 472,268 filed July 15, 1965.

This invention relates to gasoline tanks of the type used on trucks or other vehicles as a fuel supply to an internal combustion engine, and this invention is particularly directed to improvements in the vent and filler cap assemblies for such a tank.

Gasoline tanks of the type used on trucks require a vent which will prevent dangerous build-up of pressure within the tank where ambient temperature, radiant heat, engine heat, road heat, muffler heat, etc. or agitation or surge may cause increase in pressure within the tank. It is also highly desirable to provide a means for closing off the vent in the event that the truck and tank should overturn, in order to prevent escape of the gasoline with attendant fire hazard. These two requirements may be met by providing a vent opening equipped with a ball check valve arranged so that overturning of the tank results in seating of the ball by gravity to close off the vent passage. However, the provision of such a gravity-operated check valve gives rise to another problem because motion of the tank contents brought about by motion of the truck and tank over the road may cause the ball valve to close against the valve seat and thus block off the vent, and pressure within the tank may then serve to hold the ball valve in closed position. Also, the ball may stick on the seat. It is known that pressure within the tank may build up to a degree which will interfere with proper operation of the engine. A vent opening of adequate size will however permit escape of fuel due to surging.

It is the principal object of this invention to provide a novel form of vent device for a vehicle gasoline tank, which vent device remains open during normal operation, which will close in the event of overturn, and yet which cannot become accidentally closed by surging due to motion of the tank.

Another important object is to provide a novel form of surge preventer for the vent assembly, which is effective to prevent escape of fuel from the tank while providing adequate normal venting.

Another object is to provide a novel form of safety device in the vent assembly and in the filler tube closure cap, both of which act to bypass the vent passages and provide much larger vent openings into the tank in the event of overheating.

Briefly stated, these objects of the invention are achieved by providing a vented chamber having a separate inlet and outlet each communicating with the tank through separate check valves. The inlet to the chamber has a novel form of guide for a gravity ball which closes against its seat upon overturning, which guide is constructed so as to prevent the ball from being raised by motion of the tank contents into contact with the valve seat. Although the valve in the outlet may close as a result of such motion, the valve is promptly opened again by the hydraulic head of liquid fuel in the vent chamber and outlet passage. The valved outlet from the vent chamber to the tank insures return of fuel from the chamber to the tank, since the outlet has a greater flow capacity than the inlet. Liquid fuel may drain back from the chamber through the outlet while vapor and bubbles flow into the chamber through the inlet. The safety provision for providing large vent openings bypassing the check valves in the event of overheating is accomplished by use of a low melting, fusible alloy in a novel manner so that the vent valve parts or the filler pipe cap or both are separated from the tank when the temperature of the fusible alloy reaches its melting point.

Other and more detailed objects and advantages will appear hereinafter.

In the drawings:

FIGURE 1 is a sectional view showing a preferred embodiment of this invention.

FIGURE 2 is a transverse sectional view taken substantially on lines 2—2 as shown in FIGURE 1.

FIGURE 3 is a sectional view similar to FIGURE 1, showing a modification.

Referring to the drawings, a gasoline tank generally designated 10 is formed of metal and is adapted to be mounted on a vehicle such as a motor truck. The gasoline is delivered to the internal combustion engine of the truck though conventional means, not shown. A vent valve assembly generally designated 11 is mounted on the tank 10 at the highest elevation thereon. This assembly 11 includes a tubular member or sleeve 12 extending into the interior of the tank 10. The ring or sleeve is internally threaded at 13 to receive an externally threaded body member or bushing 14. This bushing 14 includes the shell 15, the valve seat member 16 and the thin annular band 17 of fusible alloy joining them together. The valve seat member 16 has an inlet passage 18 and a parallel outlet passage 19, both extending therethrough and communicating with the chamber 20.

In the form of the invention shown in FIGURE 1, the lower end 22 of the bore 18 is shaped to receive the helical convolutions of the upper end of the coil spring 21 which extends downward into the interior of the tank 10. The member 16 is provided with a downward facing tapered seat 23 above the upper end of the spring 21. A ball 24, movable freely through the interior of the spring 21, is adapted to engage the seat 23 by gravity in the event of overturn of the truck and tank 10. A closure 25 is provided at the lower end of the spring 21. The spaces between the spring convolutions serve as lateral port means connecting the inlet 18 with the interior of the tank 10.

During operation over the road, the truck and tank may have motions which produce surging of the gasoline 26 within the tank and which motions might lift the ball to engage the seat but the same motions cause the coil spring 21 to flex in first one direction and then the other, with the maximum extent of swinging motion at the lower end of the spring 21. This swinging motion of the spring 21 causes the ball 24 to remain against the closure 25 by centrifugal force and prevents the ball from traveling up the interior of the spring to reach the seat 23.

A cap 30 has an internally threaded skirt 31 engaging the external threads on the member 16. A circular baffle 32 has its outer periphery clamped between the cap 30 and the member 16 and is provided with a central aperture 33. The space 34 between the baffle 32 and the cap 30 is vented to atmosphere through internal slots 34a which interrupt the internal threads of the skirt 31 and which extend into communication with the space 34.

A porous plug 35 of sintered metal is positioned in the vent chamber 20 and has a portion extending into the inlet 18. Liquid passing from the interior of the tank 10 into the chamber 20 must pass through the pores of the plug 35. A similar porous plug 36 having less resistance to flow than the plug 35 is fixed in the upper end of the tube 37 mounted in the outlet 19. The lower end of this tube extends into the interior of the tank and is provided with a check valve 38 which closes against a seat 39 when the tank is in inverted position. The ball 38 may also close against the seat 39 by surge action of the fuel in the tank, but it opens again by hydraulic head action of the liquid fuel in tube 37. The liquid passing from the chamber 20 into the interior of the tank 10 must pass through the pores of the plug 36. In normal operation, gasoline which reaches the vent chamber 20 from the interior of the tank 10 through the inlet 18 does not remain in the chamber 20 because the outlet 19 has a greater flow capacity than the inlet 18 by reason of the greater porosity of the plug 36 and the tube is longer allowing better flow head pressure.

A tubular member or filler pipe 50 extends into the interior of the tank for a short distance, the lower end determining the normal maximum level of gasoline in the tank. Thus, when the usual filler nozzle, not shown, is introduced into the pipe 50 in the absence of the cap 51, the escape of air from the tank as it fills with gasoline is very substantially reduced when the lower end of the pipe 50 becomes submerged in gasoline. The orifices are still small enough to limit air flow out of tank during filling, causing indication through the filler opening that the tank is full. While it is possible to force fill the tank to a higher elevation, it is desirable not to do so in order to leave adequate expansion space 49 within the tank above the level of the gasoline 26.

The cap 51 for the filler pipe 50 includes a body member having a skirt 52 encircling an internally threaded ring 53. A thin annular band 54 of fusible alloy joins the skirt 52 to the ring 53. The band of fusible alloy is preferably Woods metal which melts at about 160° F. The radial thickness of the band 54 is uniform and is preferably very thin, for example, from 0.005 inch to 0.050 inch for a cap of two-inch normal size. The parts of the cap 51 including the ring 53 are preferably formed of brass for its high thermal conductivity as well as corrosion-resistance and non-sparking properties. The fact that the fusible alloy band 54 is very thin provides maximum protection against accidental melting brought about by the high specific heat value of the fusible alloy. The thin fusible band gives up its heat readily to the bonded brass parts. The fusible band 54 also provides a very high strength connection between the parts 52 and 53 as well as affording maximum fire vent area. In practice we prefer to make the radial wall thickness of the band 54 thinnest at its upper blind end 55 while the remainder is somewhat thicker, but not greater than 0.050 inch. This difference in radial thickness is achieved by means of a step bore 56 in the skirt 52 of the filler cap 51. The thinnest section 55 is provided for manufacturing reasons in order to minimize flow of liquid alloy between the upper end of the ring 53 and the under surface 57 of the filler cap 51.

In operation, the tank 10 is filled with gasoline 26 through the filler pipe 50, after first removing the filler pipe cap 51. When the upper level of gasoline rises within the tank sufficiently to submerge the lower end of the filler pipe 50, air from the tank can no longer be displaced out through the filler pipe 50, and must pass through the restrictions of the porous plugs 35 and 36, and this causes the filler pipe itself to begin to fill. The filling operation is then terminated and the filler pipe cap 51 is installed in place. Vapor accumulates in the expansion space 49 above the level of gasoline 26. This vapor is vented to the atmosphere through the space between the coils of the spring 21 through the seat 23, inlet 18, and chamber 20. Vapor is also vented through tube 37 to the chamber 20. The chamber 20 is vented to atmosphere through aperture 33, space 34 and passage slots 34a. In the event that the tank should be force filled above the level of the lower end of the filler pipe 50, the opening 59 in the sleeve 11 provides for venting of the tank through inlet 18 and chamber 20. The configuration of the cap 30, baffle 32 and slots 34a provide a flame arresting structure for the whole assembly.

In the event that the vehicle and tank 10 should overturn, the ball 24 closes against the seat 23 and the ball 38 closes against the seat 39 to prevent escape of gasoline 26 from tank 10. However, accidental lifting of the ball 24 into contact with the seat 23 while the vehicle is in motion over the road, where it might be held by vapor pressure, is prevented because the swinging movement of the lower end of the flexible coil spring 21 holds the ball against the closure 25 by centrifugal force. Even though the valve 38 might be closed against the motion of the seat 39 by motion of the tank or its contents, the ball 24 does not close against the seat 23. Gasoline which passes through inlet 18 into the vent chamber 20 by surge action escapes from the chamber 20 through the outlet tube 37, the hydraulic head acting to move the ball 38 downward away from the seat. Since the pores of the plug 36 are less restrictive than those of the plug 35, any gasoline which enters the chamber 20 through the inlet can drain back to the tank through the outlet.

It will be observed that the vent device just described may be placed at any convenient location along the top of the gasoline tank, and need not be restricted to a position midway between the ends of the tank to minimize surge effects. Tests have shown that the vent device may be placed at the forward end of the tank at the top and that no leakage occurs even when the truck is stopped suddenly to develop maximum endwise surge within the tank.

Should the tank or its contents become overheated for any reason, the annular band 54 of fusible alloy melts, and the filler pipe cap 51 is blown off by pressure within the tank before the pressure can reach the dangerous intensity. The annular band 17 of low melting alloy which forms a part of the bushing 16 functions in the same manner. Both of these fusible bands 54 and 17 provide a high strength, economical construction, with maximum vent area. Tank pressures are relieved before reaching dangerous intensities.

In the modified form of the invention shown in FIGURE 3 the spring 21 is replaced by a tube 61. This tube 61 is fixed near its upper end to the bore 62 of the bushing 16a and the valve seat 23a is conveniently fixed in the upper end of the tube 61. Vent ports 63 are provided in the wall of the tube 61 below the bushing 16a. A series of lateral indentations 64 are provided in the wall of the tube 61. These indentations 64 serve to impede upward progress of the ball 24 toward the seat 23a brought about by motion of the truck over the road.

The other parts of the apparatus shown in FIGURE 3 have the same construction and operate in the same manner as previously described.

We claim:

1. In a vehicle gasoline tank assembly, the combination of: a tank, an internally threaded sleeve secured to the upper portion of the tank and communicating with the interior thereof, a bushing having a portion extending into said sleeve, said bushing having an externally threaded ring element engaged with the threaded sleeve and having a thin annular band of fusible alloy joining said ring element to said portion of the bushing, said annular band melting upon reaching a predetermined temperature to permit axial separation of the bushing portion from the ring element and venting of the tank to atmosphere.

2. In a vehicle gasoline tank assembly, the combination of: a tank, an externally threaded filler pipe secured to the upper portion of the tank and communicating with the interior thereof, a pipe cap having a portion encircling the upper end of said filler pipe, said pipe cap having an internally threaded ring element engaged with the threaded filler pipe and having a thin annular band of fusible alloy joining said ring element to said portion of the pipe cap, said annular band melting upon reaching a predetermined temperature to permit axial separation of the pipe cap portion from the ring element and venting of the tank to atmosphere.

3. In a vehicle gas tank assembly, the combination of: a tank, a threaded tubular member secured to the upper portion of the tank and communicating with the interior thereof, a body member having a portion positioned concentrically with respect to said tubular member and having a threaded ring element engaged with the threaded tubular member, the body member having a thin annular band of fusible alloy joining said portion of the body member and said ring element, said annular band melting upon reaching a predetermined temperature to permit axial separation of the body member portion from the ring element and venting of the tank to atmosphere.

4. The combination set forth in claim 3 in which said tubular member is an internally threaded sleeve, said ring element being externally threaded, and said annular band being positioned within said ring element.

5. The combination set forth in claim 3 in which said tubular member is an externally threaded filler pipe, said ring element being internally threaded, and said annular band encircling said ring element.

References Cited

UNITED STATES PATENTS

| | | |
|---|---|---|
| 166,452 | 8/1875 | Brown et al. |
| 1,142,902 | 6/1915 | McNutt. |
| 1,953,582 | 4/1934 | Belknap _____ 169—42 |
| 2,357,620 | 9/1944 | Thomas. |

RAPHAEL M. SCHWARTZ, Primary Examiner